United States Patent
Ott et al.

(10) Patent No.: US 6,296,889 B1
(45) Date of Patent: Oct. 2, 2001

(54) USE OF 1-NONEN-3-ONE FOR AROMA/FLAVOR ENHANCEMENT

(75) Inventors: Andreas Ott, Lausanne; Alain Chaintreau, Plan-les-Ouates; Laurent B. Fay, Savigny, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/230,677
(22) PCT Filed: Jul. 22, 1997
(86) PCT No.: PCT/EP97/03964
§ 371 Date: Jan. 29, 1999
§ 102(e) Date: Jan. 29, 1999
(87) PCT Pub. No.: WO98/05220
PCT Pub. Date: Feb. 12, 1998

(30) Foreign Application Priority Data

Aug. 2, 1996 (EP) .................................... 96202184

(51) Int. Cl.⁷ ........................................ A23L 1/22
(52) U.S. Cl. .................... 426/534; 426/89; 426/580; 426/590; 426/650
(58) Field of Search ................... 426/534, 89, 96, 426/103, 535, 536, 537, 538, 650, 580, 583, 590, 594, 655

(56) References Cited

PUBLICATIONS

Webster's Ninth New Collegiate Dictionary, 1990, Merriam–Webster Inc., Publishers, Springfield, MA, p. 1381*
Blank et al., Analysis of food flavourings by gas chromatography–olfactometry, in Trends in Flavour Research, Maarse et al (Eds.), 1994 Elsevier Science, pp. 276.*

Semmelroch, et al., "Analysis of Roasted Coffee Powders and Brews by Gas Chromatography–Olfactometry of Headspace", Lebensm.–Wiss. u–Technol., 28, 310–313 (1995).

Imhof, et al., "Volatile Organic Compounds Produced by Thermophilic and Mesophilic Single Strain Dairy Starter Cultures", Lebensm.–Wiss. u–Technol., 27, 265–269 (1994).

Imhof, et al., "Quantitative GC–MS Analysis of Volatile Flavour Compounds in Pasteurized Milk and Fermented Milk Products Applying a Standard Addition Method", Lebensm.–Wiss. u–Technol., 27, 265–269 (1994).

Laye, et al., "Chemical, Microbiological and Sensory Properties of Plain Nonfat Yogurt", vol. 58, No. 5, 1993, Journal of Food Science, 991–96.

Nakahira, et al., "β–Trichlorostannyl Ketones and Aldehydes. Preparation and Facile Amine–Amine–Induced Dehydrostannation Leading to a–Methylene Ketones and Aldehydes", J. Org. Chem. 1992, vol. 57, pp. 17–28.

Ulberth, "Headspace Gas Chromatographic Estimation of Some Yogurt Volatiles", J. Assoc. Off. Anal. Chem. (vol. 74, No. 4, 1991).

* cited by examiner

Primary Examiner—Leslie Wong
(74) Attorney, Agent, or Firm—Winston & Strawn (57) ABSTRACT

1-nonen-3-one is added to food, pharamaceutical, cosmetic and perfume compositions to flavor the products and so that they impart aroma. It is added particularly to dairy products and coffee extract for enhancing the aroma imparted by those compositions. The 1-nonen-3-one may be combined with other compounds which provide flavor and aroma, and the combined compounds are added to the compositions.

15 Claims, 6 Drawing Sheets

USE OF 1-NONEN-3-ONE FOR AROMA/FLAVOR ENHANCEMENT

CROSS-REFERENCE TO RELATED APPLICATION

This application is a National Stage Application of PCT Patent Application No. PCT/EP97/03964 which was filed Jul. 22, 1997.

BACKGROUND OF THE INVENTION

The present invention relates to flavoring and aromatic agents and to provision of products to which such agents are added including foods, particularly dairy products and coffee extracts, and including pharmaceuticals, cosmetics and perfumes, to flavor the products and so that they impart aroma, and the invention further relates to identification, isolation, preparation and use of 1-nonen-3-one.

Since the 1950's, yoghurt volatiles have given rise to much interest, and more than 60 flavour compounds have been identified so far (Maars et al., Volatile compounds in food, TNO-CIVO, Food Analysis Institute, The Nederlande, 1994). Its consumption has become very popular since the 1960's due to its delicate flavour associated with its particular texture and the claimed health benefits of lactic acid bacteria for humans. Headspace and simultaneous distillation-extraction (SDE) have been commonly used for the analysis of its flavour. Because of the low intensity of yoghurt odour, the sample is often heated to increase the volatility of the flavourings (Ulbeith et al., Assoc Off. Anal. Chem. 74, 630–634, 1991). This can alter the composition of this sensitive aroma and a mild sampling technique must be applied. Using a purge-and-trap sampling at a lower temperature, Laye and Imhof, respectively identified 23 and 33 compounds (Laye at al., J. Food Sci., 58, 991–995, 1993; Imhof et al., Lebensm. Wiss. u-Technol., 27, 265–269, 1994), but no one has determined the key volatiles responsible for the typical yoghurt aroma. Recently, Imhof et al. suggested 2,3-butanedione, 2,3-pentanedione, dimethyl sulfide and benzaldehyde to be the most potent ingredients in yoghurt aroma (Lebensm. Wiss. u-Technol., Z, 78–86. 1995).

In coffee extracts, Semmelroch et al. identified, as being involved in the aroma impact, 2-methyl propanal, 2-methyl butanal, 2,3,-butanedione, 2,3-pentanedione, 3-methyl-2-butenal and guaiacol (Lebensm-Wiss. u-Technol, 28, 310–313, 1995).

In another respect, 1-nonen-3-one has already been synthesised by oxidation of the corresponding alcohol by pyridinium chlorochromate (Corey et al., Tetrahedron Letters, 31, 2647–2650, 1975; Nakahira et al., J. Org. Chem., 57, 17–28, 1992). 1-Nonen-3-one has not been yet identified in foods, according to the recognised methods agreed by the International Organisation of the Flavour Industry (Z. Lebensm. u-Forsch, 192, 530–534, 1991).

SUMMARY OF THE INVENTION

The object of the present invention is to provide a compound which is involved, in combination with other flavouring agents, in the flavouring of food products, especially dairy and coffee derivatives products.

The present invention provides a process preparing food, pharmaceutical, cosmetic and perfume compositions so that the compositions are flavored and impart aroma which comprises adding 1-nonen-3-one to such compositions in an amount which is effective for flavoring/aromatizing such compositions. As may be gathered from the description below, it has been found that addition of 1-nonen-3-one to a food, in particular to a dairy product, and more particularly to a yoghurt, and in particular also to coffee extract, enhances the aroma of the food, and it may be synthesized and added to the compositions in an amount of from about 1 ppt to about 0.1 ppm.

In another aspect, the present invention comprises preparations of composition mixtures of 1-nonen-3-one and at least a molecule, known to be involved in dairy or coffee aroma, selected from 2,3-butanedione, 2,3-pentanedione, dimethyl sulfide, methional, 2-methyl-tetrahydrothiophen-3-one, 2E-nonenal, guaiacol, methyl propanal, 2-methyl butanal, 3-methyl butanal, 2- and 3-methyl-2-butenal, 2- and 3-methyl butyric acid, 3-methyl-2-butenethiol, 2-methyl furanethiol, 2-furfurylthiol, 3-mercapto-3-methylbutylformate, 4-ethyl guaiacol, 4-vinyl guaiacol, 2-isopropyl-3-methoxypyrazine, 2,3-diethyl-5-methylpyrazine, 2-ethyl-3,5-dimethylpyrazine, 2-isobutyl-3-methoxypyrazine, beta-damascenone, vanillin, 4-hydroxy-2,5-dimethyl-3(2H)-furanone, 2-ethyl-4-hydroxy-5-methyl-3(2H)-furanone, 3-hydroxy-4,5-dimethyl-2(5H)-furanone, and 5-ethyl-3-hydroxy-4-ethyl-2(5H)-furanone.

Finally, the present invention provides a composition in a form of a powder which comprises 1-nonen-3-one encapsulated with a polysaccharide.

FURTHER DESCRIPTION OF THE INVENTION

Hyphenated gas chromatography-olfactometric techniques allow the direct determination of impact odorants in foods. Most commonly applied methods are Charm Analysis (Acree et al., The analysis of odor-active volatiles in gas chromatographic effluents, In Analysis of volatiles, de Gruyter, New York, 1984) and Aroma Extract Dilution Analysis (AEDA), (Ullrich and Grosch, Z. Lebensm. Unters. Forsch., 184, 277–282, 1987). Both methods are based on GC-olfactometry of an aroma extract which is diluted until no odor is detected at the sniffing port. More recently, Grosch's group sampled the headspace surrounding the food, since the headspace composition better represents the smell that is perceived by the consumer (Semmelroch and Grosch, Lebensm. Wiss. u-Technol, 28, 310–313, 1995).

Since the vapour phase odor is first perceived when opening a yoghurt pot or above the coffee cup, its quality will influence the consumer's preference. Because the retronasal perception is also sensitive to the headspace odor released by the yoghurt, it is preferable to focus on the headspace and to determine the main odor contributors by using a direct measurement of their individual impact.

However, a critical evaluation of dilution sniffing methods pointed out reproducibility problems (Abbott et al., J. Agric. Food chem., 41, 1698–1703, 1993).

To identify flavours in food products, only one dilution level may be used, and GC-olfactometry may be repeated several times. Aromagrams of individuals are then "averaged" to get rid of previously mentioned reproducibility problems. Resulting aromagrams allow odor profile comparisons as peak intensities are related to the frequencies of odor detection by "NIF" and "SNIF" (respectively, "Nasal Impact Frequency" and "Surface of Nasal Impact Frequency") see Ott et al., Improved headspace-GC-sniffing technique: screening of aroma impact flavourings. *4th Int. Symposium on Hyphenated Techniques in Chromatography.* Bruges, Belgium, 1996).

The method described hereafter as "procedure 1c" allows for the first time the detection of 1-nonen-3-one, and other flavouring compounds, in yoghurts and coffee brews. The odor threshold of 1-nonen-3-one is about 8 pg/kg. This extremely low threshold classifies 1-nonen-3-one among the most potent compounds identified in flavours up to now.

Many flavour molecules of dairy product and coffee brews are already known. Each of these molecules does not present a dairy or a coffee flavour. It is the combination of these flavouring molecules which leads to the typical dairy or coffee flavour. In the same way, 1-nonen-3-one presents a mushroom flavour, but when combined with other dairy or coffee flavour molecules, it enhances the final flavour perceived by the consumer. Therefore, the present invention covers also any flavouring compositions consisting essentially of 1-nonen-3-one and flavour molecules involved in the dairy and coffee aroma, said molecules may be selected in the list of flavouring molecules listed above, or presented in the examples.

The addition of 0.1 ppt to 1 ppm of 1-nonen-3-one to a dairy product can surprisingly increase the positive impact of the dairy aroma. The same observation can be made when 1-nonen-3-one is added to a coffee brew. Best results may be obtained when 0.1 ppt to 20 ppt of 1-nonen-3-one is added to a yoghurt. The use according to the invention concerns also any use of 1-nonen-3-one, as flavouring ingredient, in a mixture subjected to a process leading to the formation of a process flavouring.

A solution of polysaccharides may also be added to the reaction mixture, after conversion, and the mixture may then be freeze-dried. The polysaccharides may be cyclodextrine or maltodextrine, which for instance. The resulting powder which, may comprise up to 10% by weight of 1-nonen-3-one, is also an object of the present invention, since the encapsulation allows the stabilisation of this compound. This powder may be thus advantageously added to foods, cosmetics, pharmaceuticals or perfume compositions, in amounts presented above, for example.

The present invention is further illustrated hereafter by way of non-limiting example which provides description of characterisation of molecules involved in the flavour of food products, and the use of 1-nonen-3-one for flavouring food products. The examples are preceded by a description of various tests and are presented with reference to the accompanying drawing Figures which are identified below. All parts, ratios, and percentages are expressed on a weight basis unless otherwise stated.

TEST PROCEDURES

Test—Procedure 1a—Dynamic headspace/GC/MS:

A 10 g yoghurt sample was dispersed into 5 mL of a saturated salt solution and filled into the sparger of a purge-and-trap system (Tekmar Co., Cincinnati, Ohio). Samples were purged with ultrapure nitrogen at a flow rate from 40 to 60 mL/min during a time period varying from 5 to 99 min. Volatiles were thermally desorbed from Tenax (180° C., 4 min), cryofocussed and injected into a HP 5995 GC/MS (Hewlett Packard, Avondale Pa.) equipped with a FFAP (Supelco Inc., Bellefonte, Pa.) column, 30 m length, 0.25 mm i.d., 0.25 mm phase thickness. Helium was used as carrier gas at a 0.65 mL/min flow. The column was kept at 20° C. for 1.0 min, increased at a 4° C./min rate from 20 to 200° C., and maintained for 1 min at 200° C. The mass spectra were acquired with a source temperature of 220° C., under a 70 eV ionisation potential. Mass spectra and retention indices of the compounds detected were compared with those in user-generated libraries. Linear retention indices were determined (Van den Dool and Kratz, J. Chromatogr., 11, 463–471, 1963) after injection of a n-alkane series (C5–C17), under the same conditions.

Test—Procedure 1b—Headspace-traps/GC/MS:

100 g of yoghurt and 16 g of distilled water were poured into a 3-neck vessel of 500 mL volume, thermostated to 30° C. and rapidly stirred with a magnetic bar. Volatiles were purged with an ultrapure helium flow of 30 mL/min and trapped on Tenax tubes for 60 min. Volatiles were thermally desorbed from Tenax (250° C., 5 min), using a TD-2 thermal desorber (Scientific Instruments Services Inc., Ringoes, N.J.) at 250° C. They were cryofocussed and injected into a HP 5890 GC (Hewlett Packard, Avondale Pa.) equipped with a DB-wax column (J&W Scientific, Folsom, Calif.), (30 m length, 0.25 mm i.d., 0.25 mm phase thickness). Helium was used as carrier gas at a 0.65 mL/min flow. The column was kept at 20° C. for 5 min, increased at a 4° C./min rate to 200° C., and maintained for 10 min. The column was directly coupled with the EI source of a HP 5971 mass spectrometer operating in the same conditions as mentioned above, in scan or in SIM mode. Criteria for identification of compounds were the same as previously mentioned.

Test—Procedure 1c—Headspace cell/GC/sniffing or /FID:

The headspace cell for the determination of partition coefficients, described in Chaintreau et al., is used (Anal. Chem., 67, 3300–3304, 1995). Its repeatability was established with model mixtures, and the system exhibited a good accuracy when applied to quantitation in the vapour phase. To this end, 25 g of yoghurt or 1 g of a coffee brew were placed into the sample space of the headspace cell and equilibrated during two hours at 30° C. in a water bath. The headspace of the cell (160 mL) was then passed through the trap containing 250 mg of Tenax with a flow of 40 mL/min. Volatiles were thermally desorbed from Tenax (300° C., 15 min), using an ATD400 thermal desorber (Perkin-Elmer Corp., Norwalk, Conn.). They were refocussed on a internal cold Tenax trap (−30° C.) and desorbed at 300° C. for 3 min into a HP 5890 GC (Hewlett Packard, Avondale Pa.) equipped with a DBwax column (J&W Scientific, Folsom, Calif.), (60 m length, 0.53 mm i.d., 1.00 mm phase thickness). Helium was used as carrier gas at a 10.6 mL/min flow. The column was kept at 20° for 5 min, increased at a 4° C./min rate to 200° C., and maintained for 10 min. The column outlet was either connected to a FID or to a sniffing port (Brechbühler SA, Plan-les-Ouates, Switzerland) equipped with an humidified air make-up. After each sampling, the cell was cleaned in a vacuum oven at 50° C. under 100 mbar for at least one hour. Tenax sampling tubes were cleaned before use by heating for one hour to 300° C. under a helium flow (50 mL/min).

Eight people experienced in GC-olfactometry were selected. Sniffing of the chromatogram was divided into two parts of about 25 min. Each person participated in the sniffing of both parts of the chromatogram, but during 2 distinct sessions to be alert. Eluting aroma relevant flavourings were recorded by pressing a button during the whole sensory impression. The square signal was recorded by a HP Pascal workstation. In addition, odor descriptors were registered on tape for every peak. The 8 individual aromagrams of a given sample were summed to one chromatogram with a home-made software, yielding the averaged aromagram. Linear retention indices were calculated as mentioned. Compounds identified by GC/MS were reinjected into the GC/sniffing system to check their retention indices. Their odour quality was compared when necessary.

Test—Procedure 2—Vacuum transfer:

According to the method of Bemelmans (*Progress in Flavour Research.* D. G. Land & H. E. Nursten, Applied Science, London, 79–98, 1979), 100 g of lyophilised yoghurt were extracted in a Soxhlet apparatus during 30 h with 700 mL of freshly distilled diethyl ether. The extract was separated from fat by high vacuum transfer under $10^{-3}$ mbar and trapped at liquid nitrogen temperature. Condensates were concentrated to 3 mL on a Vigreux column. The concentrate was extracted 3 times with 1 mL of a 0.5 M $Na_2CO_3$ solution and washed 3 times with 1 mL of saturated NaCl solution. The ether extract was dried over $Na_2SO_4$ and concentrated with a micro-distillation device (Bemelmans) to 100 mL. The aqueous fractions were acidified with 1 N HCl and extracted 3 times with 10 mL of distilled diethyl ether. The etheral extract was washed with 3×10 mL of saturated NaCl solution and dried over $Na_2SO_4$. The extract was concentrated to 100 mL with a micro-distillation device.
Test—Procedure 3—Vacuum SDE:

2 kg, of yoghurt were dispersed into 2 liters previously degassed water and saturated with salt. The dispersion was SDE extracted during 7 hours in a preparative apparatus under 40 mbar, using continuous sample feeding according to a reported procedure (Chaintreau et al., European patent application No. 95203496.5). Freshly distilled butyl ethyl ether (5 ml) (Fluka AG, Buchs Switzerland) was used as the solvent. Operating temperatures were 39° C., 15° C., and 9,5° C., in the sample flask, in the sample reservoir, and in the solvent flask respectively The resulting organic extract (ca. 1 ml) was directly used for GC-MS without prior concentration.

Test—Gas Chromatography-Tandem Mass Spectrometry GC/MS/MS:

Mass spectra were acquired with a Finnigan MAT TSQ-700 mass spectrometer (San Jose, Calif.) interfaced with an HP-5890 gas chromatograph. The column was a DB-Wax column (J&W Scientific, Folsom, Calif.), 30 m length, 0.32 mm i.d., 0.25 mm phase thickness. Helium was used as carrier gas at a pressure of 10 psi. The column was kept at 600 for 1 min, increased at a 15° C./min rate to 240° C., and maintained for 2 min. Positive or negative chemical ionisation with ammonia as reagent gas were used to generate $[M+NH_4]^+$ ions or $[M-H]^-$ ions respectively, analysed by collision induced dissociation experiments. A collision energy of 6 eV in the laboratory frame was used, with argon as collision gas set to 1 mTorr.

EXAMPLES

Comparative Example

Pasteurised full fat milk from a local retailer (Orlait SA, Lausanne, Switzerland) was fortified with 2.5% of skimmed milk powder and heat treated at 98° C. for 15 minutes, immediately cooled to about 35° C. in a water bath and inoculated with a starter culture of *Streptococcus salivarius* ssp. *thermophilus* and *Lactobacillus delbrueckii* ssp. *bulgaricus*. The prepared solution was filled in sterile pots of 150 mL, hermetically sealed and fermented at 41° C. during 5 hours (until pH=4.2 was reached). Immediately after termination of fermentation the yoghurt samples were cooled to 4° C. and stored during 2 weeks at this temperature prior to analysis.

Yoghurts were analysed 2 weeks after their preparation since the flavour generation is known to mainly occur during the fermentation step and it does not significantly change during the refrigerated storage at 4° C. Flavourings were isolated from their matrix using 3 different mild sampling methods described above, that is to say procedures 1a, 1b, 2.

Results show that 86 compounds identified have already been mentioned in yoghurt, milk or skimmed milk powder, which are ingredients of the yoghurt recipe. Among the newly identified compounds, some of them could contribute to the overall aroma: 1-penten-3-ol, 3-octanone, 2-methyl tetrahydrofuran-3-one, 3-methyl-2-butenol, 2-methyl tetrahydrothiophene-3-one, and 2-methyl propanoic acid. However, these methods were not sensitive enough to detect 1-nonen-3-one.

Example 1

Figure 1:
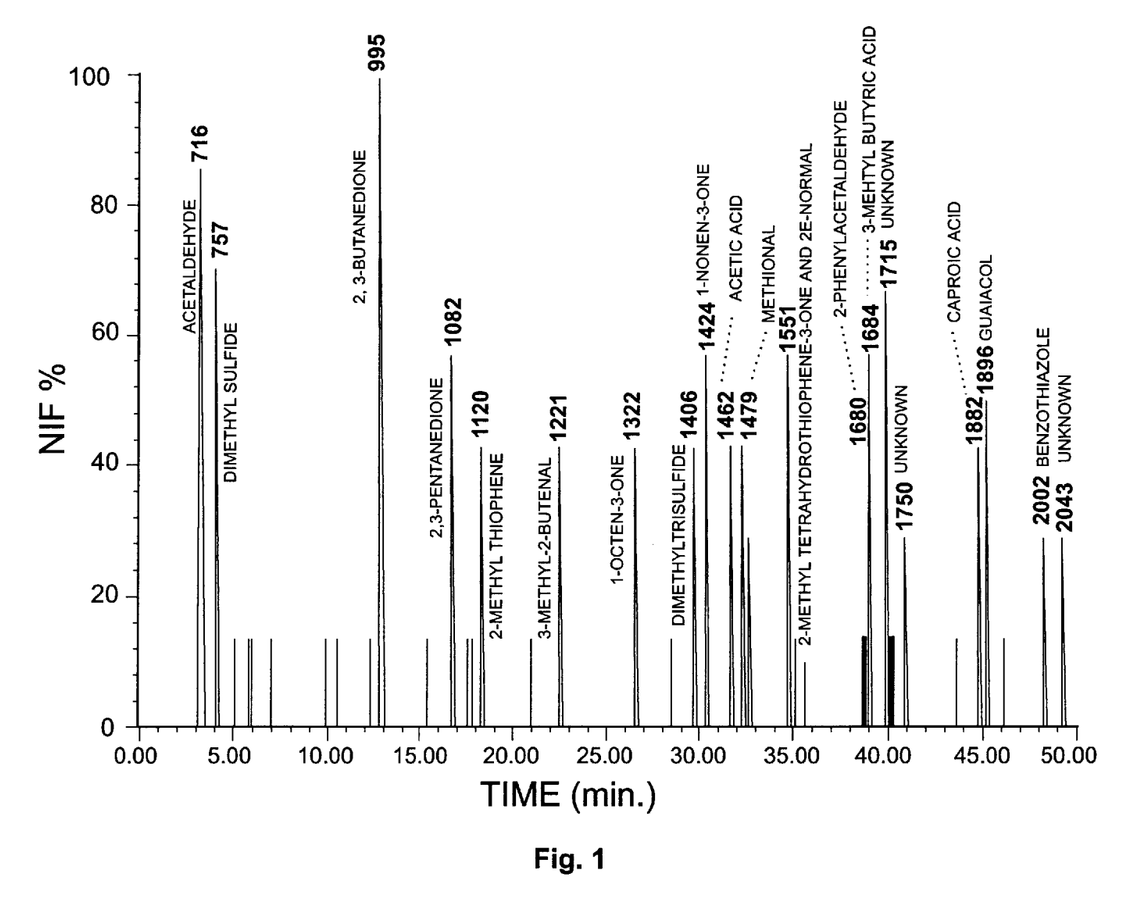
FIG. 1 presents an NIF profile of a yoghurt aroma (retention indices at the peak apex).

The yoghurt described in the comparative example is used. A SNIF profile of the yoghurt flavour was established using the headspace sampling procedure 1c, from 8 sniffing runs, as explained above. Each headspace sampling was performed with a new yoghurt originating from the same fermentation batch. Results are presented in FIG. 1 and table 1 below.

Twenty one main contributors to the overall aroma were detected. Among them, only 11 corresponded to volatiles that were identified using the 3 procedures mentioned in the comparative example. On the basis of their GC and sensorial characteristics, the identities of 7 other compounds were proposed by comparing retention indices and odor descriptors, and their retention indices were checked by re-injecting authentic samples under the same conditions using a FID detector.

TABLE 1

| Ret. ind. (1) | Ret. ind. (ref.) | Descriptors | Identification & descriptors proposed by the data-bank |
|---|---|---|---|
| 716 | 710 | fresh, green, pungent | acetaldehyde: fresh, fruity, pungent, ether |
| 757 | 754 | milk, lactone-like, sulphury, warm | dimethyl sulfide: sulphury, roasted |
| 995 | 993 | butter, diacetyl, vanilla | 2,3-butanedione: buttery, fatty, oily, vanilla |
| 1082 | 1082 | butter, vanilla, mild | 2,3-pentanedione: buttery, caramellic |
| 1120 | 1109 | gasoline, plastic, styrene | 2-methyl-thiophene: gasoline, onion-like, paraffinic |
| 1221 | 1222 | metallic, aldehydic, herbaceous | 3-methyl 2-butenal: aldehydic, caprylic, pungent |
| 1322 | 1324 | mushroom, earthy | 1-octen-3-one: mushroom |
| 1406 | 1403 | sulfury, H$_2$S, faecal | dimethyl trisulfide: strong sulphurous, cabbage, alliaceous |
| 1424 | 1425 | mushroom, earthy | no data |

TABLE 1-continued

| Ret. ind. (1) | Ret. ind. (ref.) | Descriptors | Identification & descriptors proposed by the data-bank |
|---|---|---|---|
| 1462 | 1460 | pungent, acidic, vinegar | acetic acid: sour, vinegar-like |
| 1479 | 1479 | soup, cooked vegetable, pungent, sulphury | methional: aldehydic, caprylic, cooked potato-like, green, sulphurous |
| 1551 | 1557 | green, leather, sulphury | 2E-nonenal + 2-methyl tetrahydrothiophen-3-one: fatty, green, pungent, leather |
| 1680 | 1678 | flowery | 2-phenyl acetaldehyde: floral, honey-like |
| 1684 | 1688 | sweaty, cheese, soy sauce, flowery | 3-methyl butyric acid: acidic, cheese-like |
| 1715 | no data | flowery, warm, caramel | no data |
| 1750 | no data | metallic | no data |
| 1882 | 1862–1885 | rancid, flowery | caproic acid: acidic, caprylic, fatty |
| 1896 | 1894 | bacon, phenolic, smoked, spicy | guaiacol: aromatic, burnt, phenolic, spicy |
| 2002 | 2000 | burnt, rubbery | benzothiazole: roasted, rubbery |
| 2043 | no data | hydrocarbon, chemical, burnt rubber | no data |

(1) Retention index on DBWAX phase, using a headspace injection (procedure 1c).

Identification proposals of the sensorial database were confirmed by preparing samples according to procedure described in table 2, and then by GC/MS experiments according to procedure 1a, or by GC/MS/MS experiments described above. Results are shown in table 2.

Because of the low amount of each compound, full scan spectra could not be obtained by mass spectrometry in every case. Therefore, the compounds were selectively analysed either by selected ion monitoring (SIM) of specific ions produced after electron impact or by collision induced dissociation. Parent ions $[M+NH_4]^+$ or $[M-H]^-$ were generated after positive or negative chemical ionisation respectively. In this case, the characteristic daughter ions obtained for each compound were recorded (selective reaction monitoring (SRM) experiment) if eluted from the GC column at the same retention time as the reference molecule.

TABLE 2

| Compound | Ret. Index (a) | Sampling (b) | Mass spectrometric experiment |
|---|---|---|---|
| 1-Octen-3-one | 1322 | Proc. 3 | GC/MS/MS, SIM in CI |
| 1-Nonen-3-one | 1424 | Proc. 3 | GC/MS/MS, SIM in CI |
| Methional | 1479 | Proc. 3 | GC/MS, SIM in EI |
| 2-methyl-tetrahydrothiophen-3-one | 1551 | Proc. 1b | GC/MS, full scan in EI |
| 2E-nonenal | 1551 | Proc. 1c | Ret. index on DBWAX and SPB-1 |
| Phenyl-acetaldehyde | 1682 | Proc. 2 & 3 | GC/MS-SIM in EI |
| Guaiacol | 1896 | Proc. 3 | GC/MS/MS, SIM in EI |

(a) Indices found by sniffing.
(b) Procedure used for the sample preparation.

Figure 2:
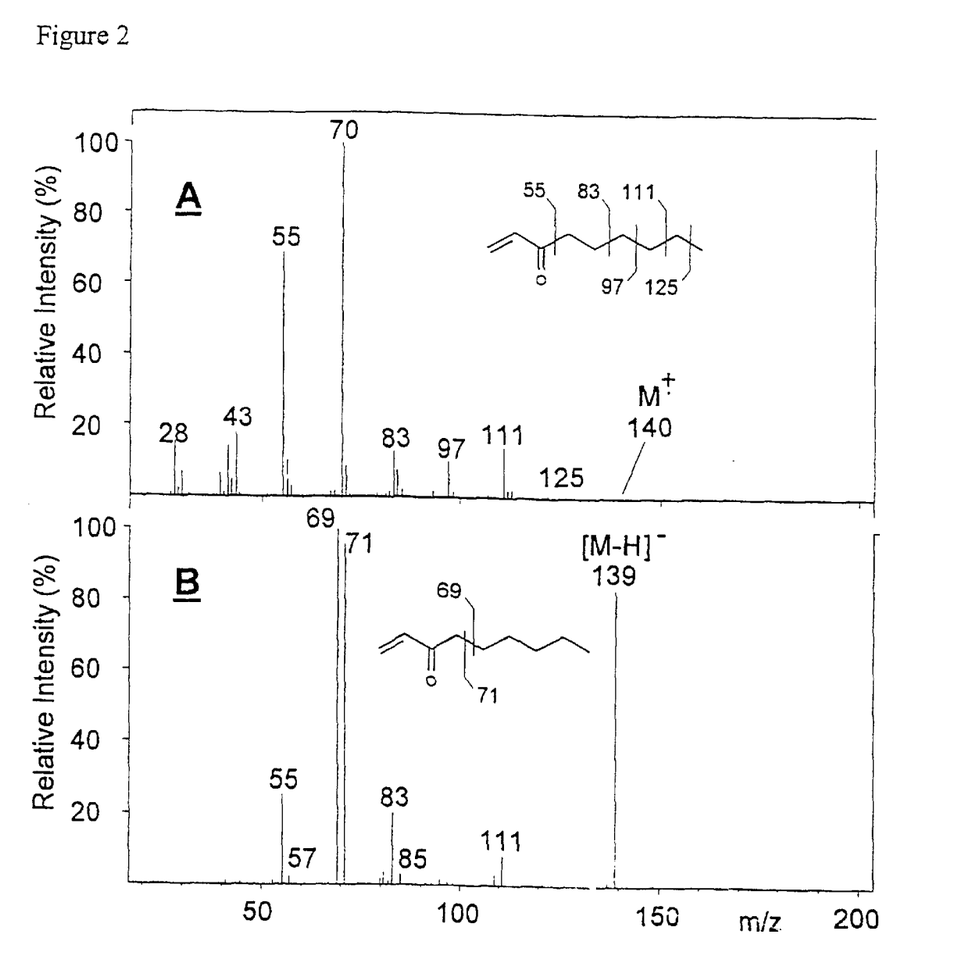
FIG. 2 presents a mass spectra of 1-nonen-3-one (A: EI ionisation spectrum; B: negative CI spectrum).
Figure 3:
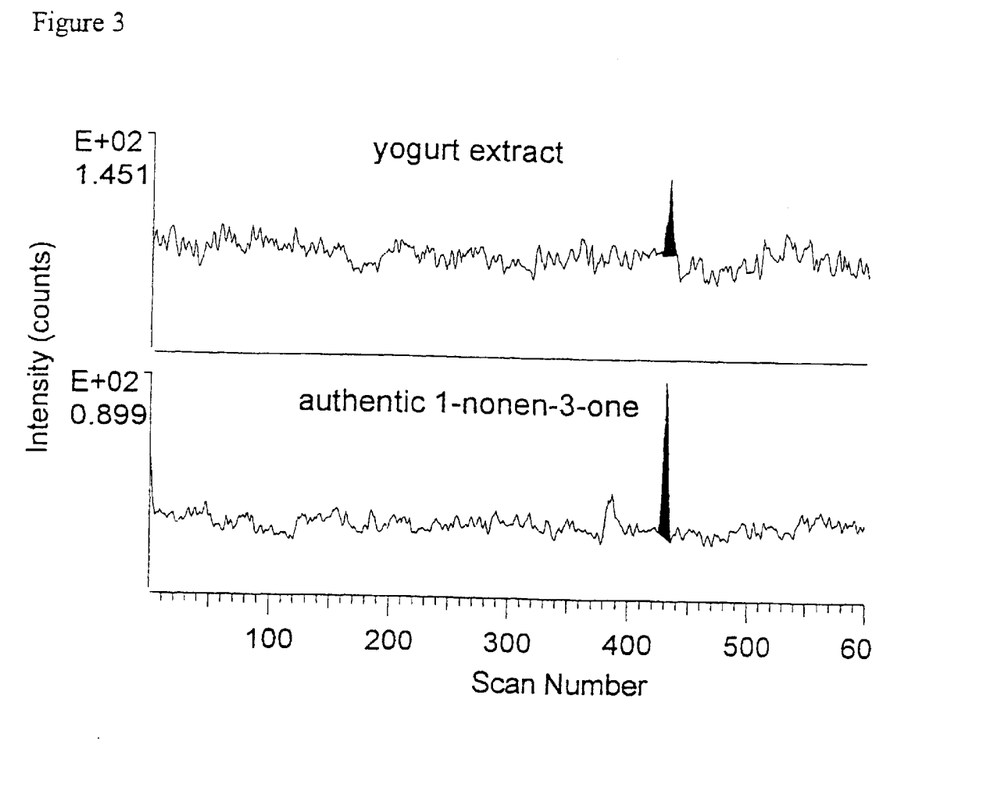
FIG. 3 presents GC/MS/MS chromatograms of daughter ion 69 obtained by SRM from the [M–H] ion at m/z 139; lower trace: 59 pg of reference compound; upper trace: 5 µl of yoghurt extract.

As an example, FIG. 2A presents the electron impact ionisation mass spectrum of 1-nonen-3-one and FIG. 2B presents its mass spectrum after collision induced dissociation of the $[M-H]^-$ ions. 1-Nonen-3-one was looked for in the yoghurt extract after monitoring the daughter ion at m/z 69 from its parent ion at m/z 139. The GC/MS/MS traces obtained for a yoghurt extract and for a standard of the reference compound are presented in FIG. 3.

Over the 7 flavourings of Table 2, five of them (1-nonen-3-one, methional, 2-methyl-tetrahydrothiophen-3-one, 2E-nonenal, and guaiacol) were detected for the first time in the yoghurt flavour.

Figure 4:
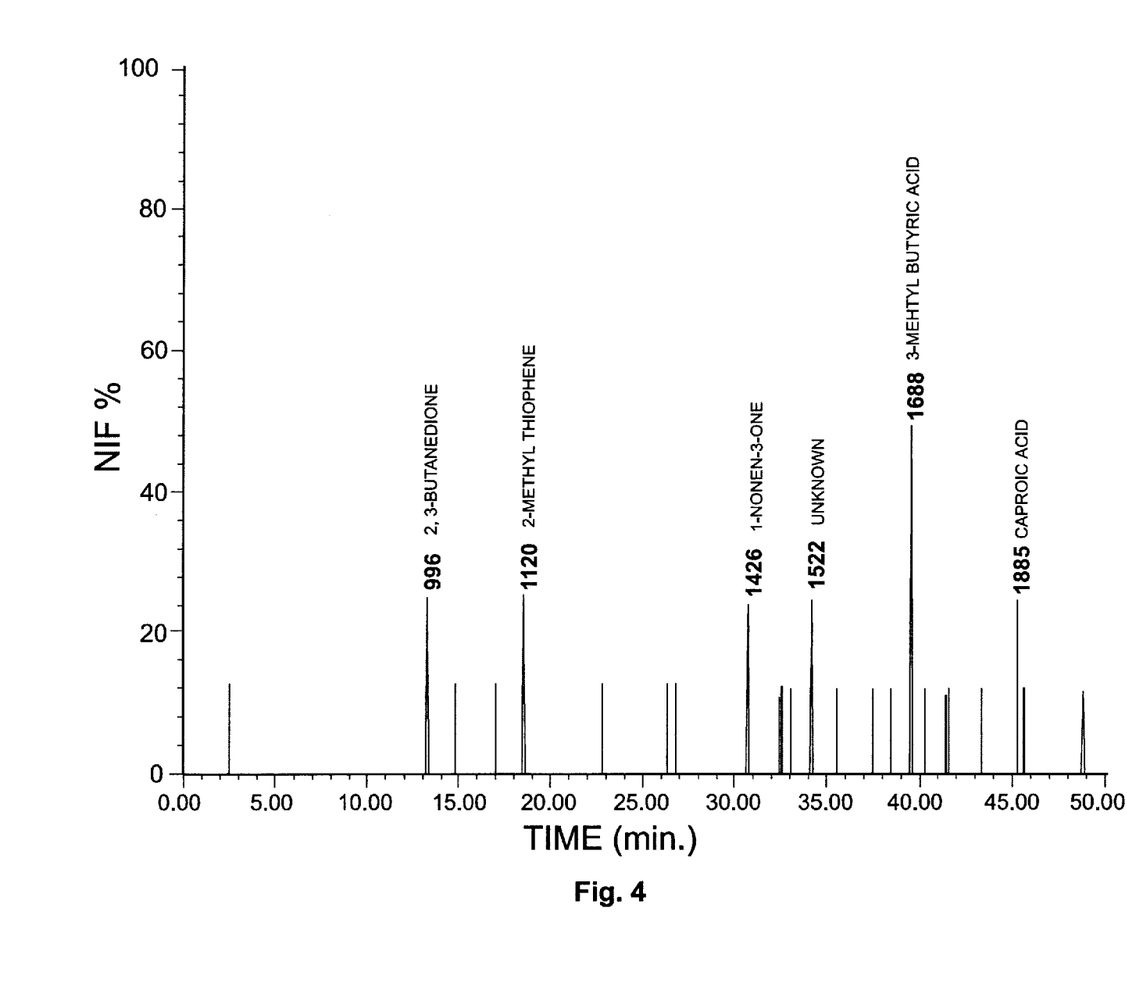
FIG. 4 presents an NIF profile of a blank experiment (headspace cell loaded with distilled water).

A blank experiment was run by loading the headspace cell with distilled water instead of yoghurt. Some peaks corresponding to those found in yoghurt were detected, but with a lower intensity (FIG. 4). As 3-methyl butyric acid and hexanoic acid were also found without using a Tenax trapping (sampling procedure 2 and 3), they do not correspond to artefacts. In addition, all peaks of the blank, except 1-nonen-3-one, have already been mentioned as occurring in milk and/or yoghurt. Consequently, odor contributors of FIG. 1 originate from the yoghurt flavour itself.

A special attention was paid to 1-nonen-3-one, as no spectral evidence was ever given for this compound in any flavour. 1-Nonen-3-one has not been positively identified in any food flavour and this compound is not commercially available. Even the corresponding alcohol, 1-nonen-3-ol, seems not to be a common aroma component: only 3 natural occurrences are reported: chervil, beef fat, and banana (Maarse et al., 1994, see above).

A reference sample was then prepared to elucidate its sensorial and analytical properties. 1-Nonen-3-one was obtained by oxidation of the corresponding alcohol by pyridinium chlorochromate (Corey & Suggs, 1975, see above) and purified by preparative HPLC. MS, $^1H$ and $^{13}C$ NMR spectra were in agreement with published data (Nakahira et al., 1992, see above).

In addition to its mass spectra (FIG. 2), its retention indices on different phases were determined (Table 3). According to quantity of the reference compound used in FIG. 3, the 1-nonen-3-one concentration in yoghurt seems to be in the 2–5 ppt range. As 1-nonen-3-one was also detected in the blank sniffing experiment, it could be postulated that the Tenax degradation could generate this compound like in the Bravo's experiment of polyethylene degradation (J. Agric. Food. Chem., 40, 1881–1885, 1992). As the positive spectral identification was performed on the SDE extract (procedure 3), this hypothesis can be excluded.

TABLE 3 retention indices and odor description of 1-nonen-3-one occurring in some food flavours.

| Sample | DB-Wax | SE-54 | FFAP | OV-1701 | SPBI | Descriptor |
|---|---|---|---|---|---|---|
| 1-Nonen-3-one (authentic) | 1400 (a) 1425 (b) | 1080 (a) | 1398 (a) | 1171 (a) | 1070 (a) 1065 (b) | mushroom, earthy |
| Yoghurt | 1424 (b) | — | — | — | 1065 (b) | mushroom, earthy |
| Coffee brew (see example 4) | 1427 (b) | — | — | — | 1061 (b) | mushroom, earthy |

(a) 1-nonen-3-one injected as solution
(b) 1-nonen-3-one absorbed on Tenax and injected with the ATD400 system.

Example 2

The nasal perception threshold of 1-nonen-3-one was measured using a triangle presentation. Series of three samples in weighing jars of 65 ml volume containing 35 ml of liquid were presented to a group of 21 trained panellists. One sample contained the stimulus dissolved in mineral water (Vittel), the other two samples were mineral water only. For each session five different groups with increasing concentrations of the stimulus were presented and the assessors had to indicate which sample was different from the two others. All trials were performed at room temperature (21° C.). Glass vessel was washed before use with a 2% aqueous solution of RBS (Fluka AG Buchs, Switzerland) then rinsed with deionized and afterwards with distilled water. All glass material was stored in a vacuum oven at 50° C. and 100 mbar at least overnight prior to use. The equation expressing the probit as a function of the concentration logarithm was adjusted to the experimental data using the curve fitting software: 'TableCurve 2D' for Windows (Jandel Scientific, Erkrath, Germany).

The threshold was determined by sniffing a series of triangle tests of an aqueous solution, and panellists answers were treated according a reported method (Voirol and Daget, Lebensm. Wiss. u-Technol., 19, 316–319, 1986). In a forced choice answer procedure some correct answers are due to chance. Results were therefore corrected using the following formula:

% perception=% correct answers−(1−% correct answers)/2

Figure 5:
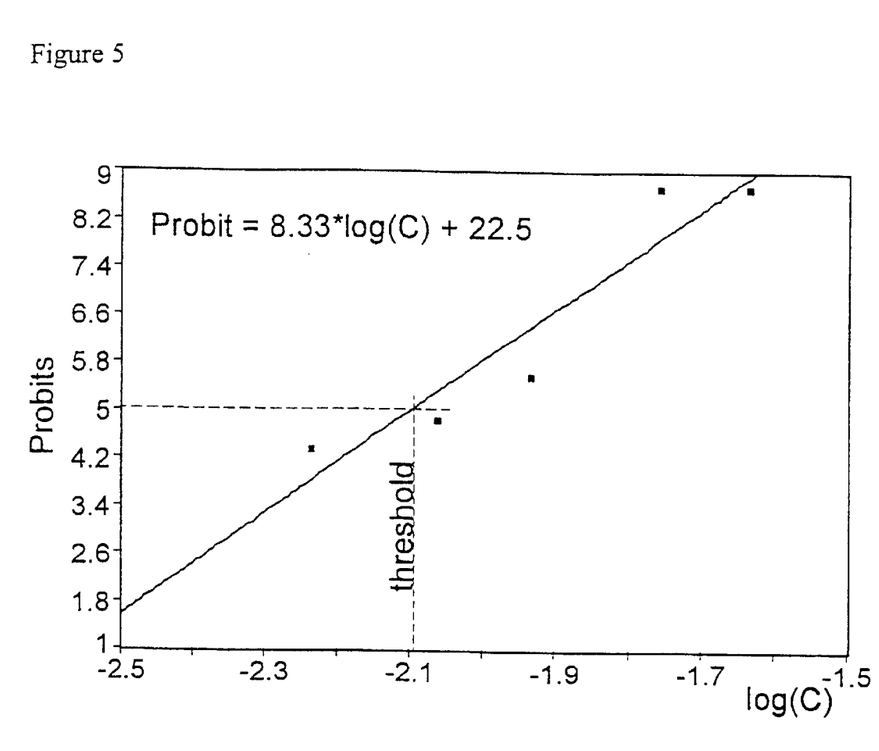
FIG. 5 presents a determination of the 1-nonen-3-one threshold (C: concentration expressed in ng/kg).

Perception percentages were transformed to probit values using the table established by Bliss (Bliss, Statistics in Biology. McGraw-Hill: London, 1967). Probit values were plotted against the logarithm of the concentrations. The value for 50% perception (or for a probit value of 5) defined as perception threshold was calculated to be 8 pg/kg (FIG. 5).

This extremely low threshold classifies 1-nonen-3-one among the most potent compounds identified in flavours and off-flavours up to now (Table 4). Consequently, its concentration must be very low in any flavour, which explains why its identification was not spectrally proved up to now.

TABLE 4 most potent flavours and off-flavours.

| Compound | Odor threshold (pg/kg) | Reference |
| --- | --- | --- |
| 2,3,6-trichloroanisole | 0.3 | Ewender et al., 1995 |
| 2,3,6-tribromoanisole | 8 | Ewender et al., 1995 |
| 1-nonen-3-one | 8 | Invention |
| 2(5H)-furanone, 5-ethyl, 3-hydroxy, 4-methyl | 10 | Kobayashi et al., 1989 |
| 2-isobutyl-3-methylpyrazine | 20 | Ewender et al., 1995 |

Kobayashi et al., 1989: Sotolon-identification, formation and effect on flavor, in Flavor Chemistry: trends and development, ACS Symp. series 388, ACS, Washington D.C., 49–59.

Ewender et al., 1995: Sensory problems caused by food packaging interactions: overview and treatment of recent case studies. In Food and Packaging Materials. Ackermann. Royal Society of Chemistry. London: 1995, 33–44.

Example 3

1-Nonen-3-one, obtained by oxidation of the corresponding alcohol by pyridinium chlorochromate (Corey & Suggs, 1975, see above) and purified by preparative HPLC, is added after fermentation to a mild low acidic full fat yoghurt as solution in water (1 ppb) for the following concentrations in the final product: 0.5, 10 and 20 ppt. All samples are corrected for the added water and presented randomly together with a standard containing no added 1-nonen-3-one. A panel of 13 participants are a asked to give their preference for the samples by ranking them from 1 to 5.

Results show that an addition of 0.5, 5 and 10 ppt gave a pleasant and creamy yoghurt which was preferred to the standard. A concentration of 20 ppt was found to be too high to have a positive effect.

Example 4

Coffee blend used had the following composition: 50% Columbia beans, 50% Honduras beans.

The blend was conventionally roasted for 5 min. Its colour measured with a Minolta and a Neuhaus apparatus was respectively: 9.1 and 75. It was quenched with 4% water. Roast beans were stored at −40° C. until they were used. The beans were ground and brewed (17 g for 200 ml Vittel's water, "Grande Source") in a domestic coffee maker (Turmix, "Gold Filter 720") just before analysis.

Figure 6:
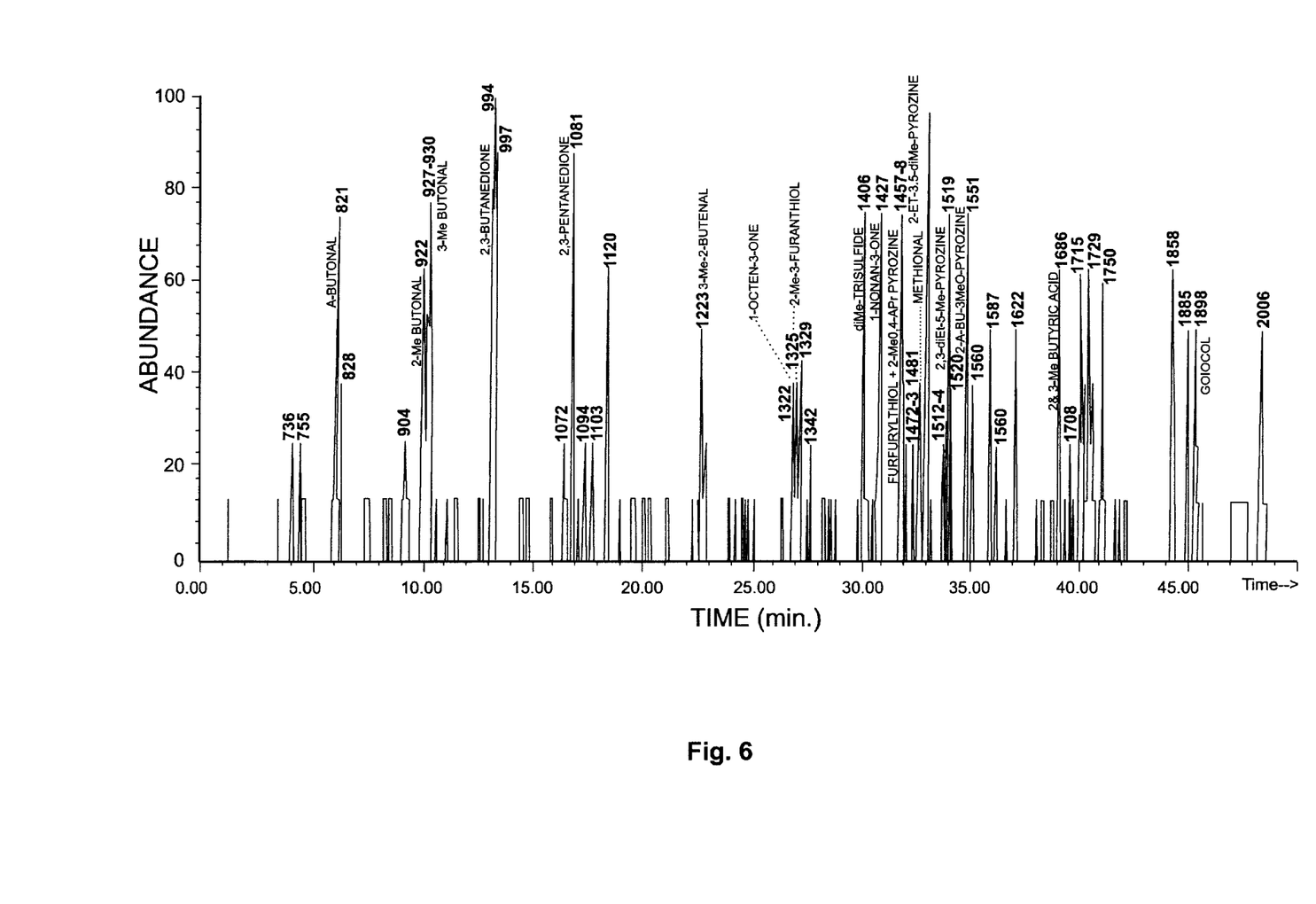
FIG. 6 presents a NIF profile of a coffee brew aroma.

A SNIF profile of the coffee brew was established using the headspace sampling procedure 1c described above. Identification proposals of the sensorial data were also confirmed by GC/MS/MS experiments as described above. Results are presented in table 5 and FIG. 6 below.

TABLE 5

| Ret index (1) | DESCRIPTORS | COMPOUND |
| --- | --- | --- |
| 755 | aromatic, plastic | |
| 821 | keton, aldehyde, gas, etheral, choco-malt, coffee | 2-methyl propanal |
| 826 | glue | |
| 923 | chocolate, malt, feet, aldehyde | 2-methyl butanal |
| 927–30 | chocolate, malt, feet, aldehyde | 3-methyl butanal |
| 994–7 | floral, buttery | 2,3-butanedione |
| 1072 | coffee | |
| 1081 | buttery, caramel | 2,3-pentanedione |
| 1120 | etheral, plastic, acrylic, 1-penten-3-one | |
| 1223 | pungent | 3-methyl-2-butenal |
| 1322 | mushroom | 1-octen-3-one |
| 1325 | gas | 2-methyl-3-furanthiol |
| 1329 | mouldy, pyrazine, roast almonds | |
| 1406 | sulfury, fresh, plastic, gas | dimethyl-trisulfide |
| 1427 | plastic, mushroom | 1-nonen-3-one |
| 1457–8 | peas, mouldy, pyrazine, burnt bread crust | furfuryl thiol + 2-MeO-3-i-Pr-Pyrazine |
| 1481 | mouldy | methional |
| 1519 | roast almonds, pyrazine, etheral, mouldy paper | 2,3-diethyl, 5-methyl pyrazine |
| 1529 | pyrazine, thiazole | |
| 1551 | gasoline, dusty, earthy, thiazole/sulfury, pyrazine | 2-iso butyl, 3-methoxy pyrazine |
| 1560 | fatty, green | |
| 1587 | pyrazine, thiazole | |
| 1622 | etheral, mouldy | |
| 1586 | honey, floral, mushroom, sulfural | 2 & 3-Methyl butyric acid |
| 1715 | gas, sulfury, hard-boiled egg, mocha, benzenic | |
| 1729–34 | fatty, fried food, fritter | |

TABLE 5-continued

| Ret index (1) | DESCRIPTORS | COMPOUND |
| --- | --- | --- |
| 1750 | alkene, mushroom, mouldy, fish-amine, etheral | |
| 1858 | browned apple, vinous, fruity minty | |
| 1885 | etheral, coffee | |
| 1896 | smoke, pharmaceutical | guaiacol |
| 2006 | vinous, hydrogen peroxyde | |

(1) Retention index on DBWAX phase, using a headspace injection (procedure 1c).

What is claimed is:

1. A process for enhancing aroma of a dairy product comprising adding an amount of 1-nonen-3-one to the dairy product in an amount which is effective for enhancing aroma imparted by the dairy product.

2. A process according to claim 1 wherein the dairy product is a yoghurt.

3. A process for enhancing aroma of a coffee extract comprising adding an amount of 1-nonen-3-one to the coffee extract in an amount which is effective for enhancing aroma imparted by the coffee extract.

4. A process according to claim 1 wherein the 1-nonen-3-one is added in an amount of from about 1 ppm to about 0.1 ppm.

5. A process according to claim 2 wherein the 1-nonen-3-one is added in an amount of from about 1 ppm to about 0.1 ppm.

6. A process according to claim 3 wherein the 1-nonen-3-one is added in an amount of from about 1 ppm to about 0.1 ppm.

7. A process according to claim 2 wherein the 1-nonen-3-one is added in an amount of from 0.1 ppt to 20 ppt.

8. A process according to claim 5 wherein the polysaccharide is selected from the group consisting of cyclodextrine and maltodextrine.

9. A process for preparing a composition which, to obtain the composition, consists essentially of combining 1-nonen-3-one with at least one compound which is selected from the group consisting of 2,3-butanedione, 2,3-pentanedione, dimethyl sulfide, methional, 2-methyl-tetrahydrothiophen-3-one, 2E-nonenal, guaiacol, methyl propanal, 2-methyl butanal, 3-methyl butanal, 2- and 3-methyl-2-butenal, 2- and 3-methylbutyric acid, 3-methyl-2-butenethiol, 2-methyl furanethiol, 2-furfurylthiol, 3-mercapto-3-methylbutylformate, 4-ethyl guaiacol, 4-vinyl guaiacol, 2-isopropyl-3-methoxypyrazine, 2,3-diethyl-5-methylpyrazine, 2-ethyl-3,5-dimethylpyrazine, 2-isobutyl-3-methoxypyrazine, beta-damascenone, vanillin, 4-hydroxy-2,5-dimethyl-3(2H)-furanone, 2-ethyl-4-hydroxy-5-methyl-3(2H)-furanone, 3-hydroxy-4,5-dimethyl-2(5H)-furanone, and 5-ethyl-3-hydroxy-4-methyl-2(5H)-furanone and encapsulating the 1-nonen-3-one and the at least one compound in a polysaccharide composition.

10. A process according to claim 9 wherein the 1-nonen-3-one is combined with at least one molecule of the at least one compound.

11. A process according to claim 9 wherein the polysaccharide composition is selected from the group consisting of cyclodextrine and maltodextrine.

12. The composition of the process of claim 9.

13. A composition which consists essentially of 1-nonen-3-one, synthesized by a process to prepare a product consisting essentially of 1-nonen-3-one, and at least one compound which is selected from the group consisting of 2,3-butanedione, 2,3-pentanedione, dimethyl sulfide, methional, 2-methyl-tetrahydrothiophen-3-one, 2E-nonenal, guaiacol, methyl propanal, 2-methyl butanal, 3-methyl butanal, 2- and 3-methyl-2-butenal, 2- and 3-methylbutyric acid, 3-methyl-2-butenethiol, 2-methyl furanethiol, 2-furfurylthiol, 3-mercapto-3-methylbutylformate, 4-ethyl guaiacol, 4-vinyl guaiacol, 2-isopropyl-3-methoxypyrazine, 2,3-diethyl-5-methylpyrazine, 2-ethyl-3,5-dimethylpyrazine, 2-isobutyl-3-methoxypyrazine, beta-damascenone, vanillin, 4-hydroxy-2,5-dimethyl-3(2H)-furanone, 2-ethyl-4-hydroxy-5-methyl-3(2H)-furanone, 3-hydroxy-4,5-dimethyl-2(5H)-furanone, and 5-ethyl-3-hydroxy-4-methyl-2(5H)-furanone.

14. A composition which consists essentially of 1-nonen-3-one and at least one further compound encapsulated in a polysaccharide composition wherein the further compound is selected from the group consisting of 2,3-butanedione, 2,3-pentanedione, dimethyl sulfide, methional, 2-methyl-tetrahydrothiophen-3-one, 2E-nonenal, guaiacol, methyl propanal, 2-methyl butanal, 3-methyl butanal, 2- and 3-methyl-2-butenal, 2- and 3-methylbutyric acid, 3-methyl-2-butenethiol, 2-methyl furanethiol, 2-furfurylthiol, 3-mercapto-3-methylbutylformate, 4-ethyl guaiacol, 4-vinyl guaiacol, 2-isopropyl-3-methoxypyrazine, 2,3-diethyl-5-methylpyrazine, 2-ethyl-3,5-dimethylpyrazine, 2-isobutyl-3-methoxypyrazine, beta-damascenone, vanillin, 4-hydroxy-2,5-dimethyl-3(2H)-furanone, 2-ethyl-4-hydroxy-5-methyl-3(2H)-furanone, 3-hydroxy-4,5-dimethyl-2(5H)-furanone, and 5-ethyl-3-hydroxy-4-methyl-2(5H)-furanone.

15. A composition according to claim 14 wherein the polysaccharide composition is selected from the group consisting of cyclodextrine and maltodextrine.

* * * * *

UNITED STATES PATENT AND TRADEMARK OFFICE
CERTIFICATE OF CORRECTION

PATENT NO. : 6,296,889 B1      Page 1 of 1
DATED : October 2, 2001
INVENTOR(S) : Ott et al.

It is certified that error appears in the above-identified patent and that said Letters Patent is hereby corrected as shown below:

<u>Column 11,</u>
Line 27, after "of from about 1", change "ppm" to -- ppt --
Line 30, after "of from about 1", change "ppm" to -- ppt --
Line 33, after "of from about 1", change "ppm" to -- ppt --

Signed and Sealed this

Fifth Day of March, 2002

*Attest:*

*Attesting Officer*

JAMES E. ROGAN
*Director of the United States Patent and Trademark Office*